July 11, 1933.  P. I. SCHULTZ  1,917,603
DISPLAY PANEL
Filed May 23, 1931  2 Sheets-Sheet 2

Inventor
Paul I. Schultz
By Bates, Goldrick & Teare
Attorneys

Patented July 11, 1933

1,917,603

UNITED STATES PATENT OFFICE

PAUL I. SCHULTZ, OF CLEVELAND, OHIO, ASSIGNOR TO THE UNITED STATES AIR COMPRESSOR COMPANY, OF CLEVELAND, OHIO, A CORPORATION OF OHIO

DISPLAY PANEL

Application filed May 23, 1931. Serial No. 539,519.

This invention relates to display panels and particularly to those, which are adapted to be mounted upon an easel or attached to a wall surface. The present tendency in the modern practice of greasing automobiles is to utilize different types of lubricant for the different parts of a vehicle. Car manufacturers have been making repeated efforts to advise motorists of the necessity for specialized lubrication, and so the practice has arisen of providing different lubricant guns on a display panel, which is mounted where it can be readily seen by motorists while the car is being greased. The various uses for the different types of lubricant are, as follows:—

Draining and refilling wet clutch
Motor oil for hub and oil cups or cans
Transmission and differential
Spicer universal joint
Oil tight universal joint
Steering gear
Water pump
Wheel bearing In order therefore, to enable the motorist to acquire the knowledge of the advantages of specialized lubrication, the practice has been for garage owners to mount the different types of guns upon a display panel, with the indication beneath the gun of the particular purpose for which it is to be used. At the present time, the full quota calls for a panel that will hold about eight different guns. Opinions differ among the various garage owners however, regarding the necessity for such procedure, and so a display panel initially made for holding a given number of devices will appear misplaced if it is equipped only with a smaller number. Thus, it is necessary to construct a special panel to suit the requirements of any particular garage owner. This procedure however, is objectionable for it necessitates the formation of a panel for each particular installation or else it requires boards of all sizes and styles to be kept in stock, but this would be economically prohibitive.

An object of the present invention therefore, is to provide a display panel which will be readily adapted for displaying any number of devices, and yet which will not require a manufacturer to stock a large number of panels of different size. In this connection, my invention necessitates the provision of a panel, which may be adapted for mounting either on an easel or on a wall, and which will be extremely rigid in construction, and capable of being quickly modified to suit any particular location.

Figure 1:
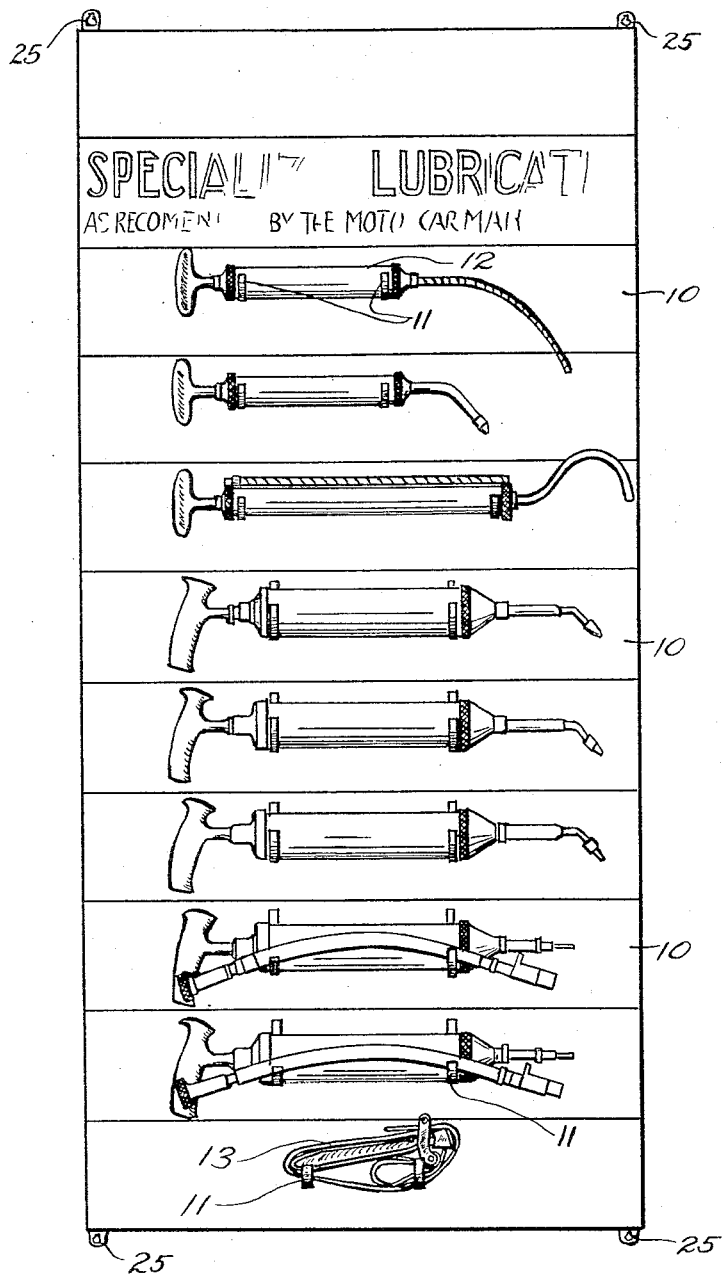
Figure 2:
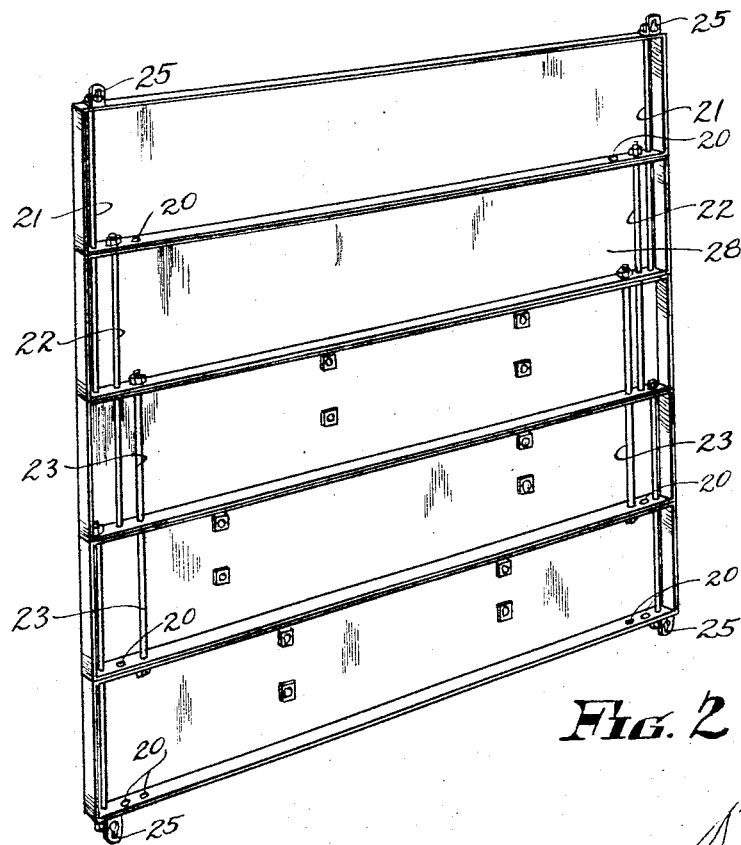
Figure 3:
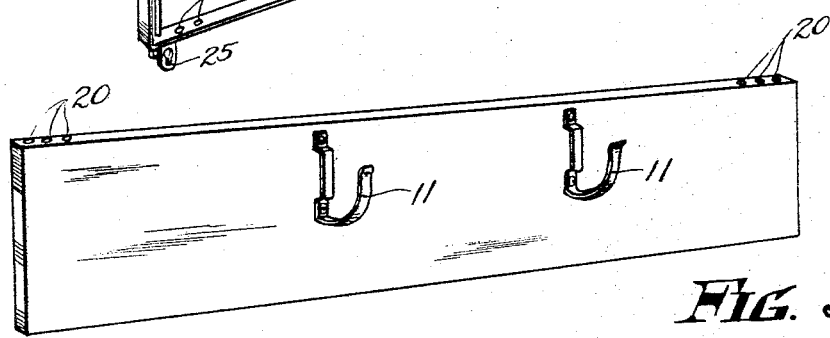
Figure 4:
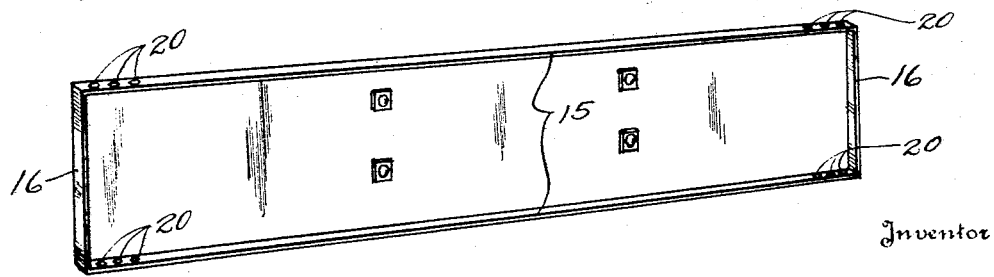

Referring now to the drawings, Fig. 1 is a front elevation of a display panel embodying my invention; Fig. 2 is a perspective view of the rear part of the panel; Fig. 3 is a perspective front view of one section, and Fig. 4 is a perspective rear view of the section shown in Fig. 3.

My display panel comprises a plurality of sections which are adapted to be interconnected regardless of the number of sections which may be used. Fig. 1, for example, is a display panel illustrating sections 10 that are provided with clips 11 to support hand operated dispensing devices 12, the bottom section being shown however, as having a special hub cap wrench 13 positioned thereon. Each panel is preferably a rectangular sheet metal section having top and bottom flanges 15 and end flanges 16 which extend rearwardly from the base of the panel as is shown particularly in Fig. 4.

To connect the flanges in a rigid and economical manner and yet to permit any particular section to be removed and the remaining sections fastened together, I provide openings 20 in the top and bottom flanges and in spaced relationship, near the ends of the section. The openings in the top flange are in alignment with those in the bottom flange, and the openings are positioned in the identical place in each of the sections so that bolts may be passed therethrough for locking the sections together.

The locking arrangement shown embodies bolts, each of which extends entirely through two sections and locks them to the flanges of the adjacent sections. Thus, for example in Fig. 2 the bolts 21 extend from the upper flange of the top section, through the second section and engage against the top flange of the third section. Such bolts may occupy the outermost openings in the flanges. Similarly bolts 22 extend through the second and third sections while bolts 23 extend through the third and fourth sections. The procedure is then repeated for additional sections.

With this arrangement, the various sections are rigidly interlocked, inasmuch as the bolts extend across two of the sections and inasmuch as there are a plurality of bolts disposed through the intermediate sections at spaced intervals. This feature combined with the flanged construction provides a panel that is extremely rigid and capable of being supported on an easel or of being attached to a wall by brackets 25. Such brackets may be L-shaped members that are locked to the section beneath the heads of the topmost bolts.

A further advantage of the present panel is the fact that any particular section can readily be removed and the remaining sections connected together in an expeditious manner. Suppose for example, the section 28 in Fig. 2 is intended to be removed. In such event, the bolts which extend through such sections may be loosened and the section removed and the top panel replaced. At such time, bolts 21 may be removed, and the bolts 22 then caused to extend through the new top panel while the nuts for the bolts 23 will be fastened to the bottom flange of the new top section. It is therefore, apparent that the manufacturer of these panels need carry in stock only a small number of sections, for they may be immediately assembled in accordance with the particular requirements of any individual user.

I therefore claim:

1. In combination, a plurality of readily interchangeable panel units, and means for interconnecting said panel units, said interconnecting means comprising a plurality of members, each of which extends across at least two of said panel units, and said panel units having flanges extending in the same direction, said interconnecting means cooperating with the flanges to provide a self-sustaining unit.

2. A display panel, comprising a plurality of interchangeable sections, each section being rectangular in shape, and having an integrally-formed rearwardly-extending flange around the edges thereof, said sections being assembled with their longitudinal edges together and the flanges extending in the same direction, there being a plurality of aligned openings through the contiguous longitudinal flanges adjacent the ends of each section, and a plurality of bolts in parallel staggered relationship passing through the aligned openings, each bolt extending entirely through two sections and locking them to the flanges of the adjacent sections, and each bolt extending through one section in common with a second bolt and through another section not spanned by said second bolt.

3. In combination, a plurality of readily interchangeable panel units, each unit having parallel longitudinal edges, flanges extending rearwardly from said edges, there being spaced openings through said flanges, said openings being uniformly arranged in all units, and said units being assembled with the flanges in contact and facing the same direction with the spaced openings in alignment, a plurality of interconnecting members passing through said openings, each member extending across at least two of said units, and locking them to the flanges of the adjacent sections, said interconnecting members cooperating with the flanges to provide a self-sustaining unit.

In testimony whereof, I hereunto affix my signature.

PAUL I. SCHULTZ.